United States Patent
Aoyama et al.

(10) Patent No.: US 6,455,008 B1
(45) Date of Patent: Sep. 24, 2002

(54) FUEL REFORMER AND FUEL REFORMING METHOD

(75) Inventors: Satoshi Aoyama, Susono; Yasushi Araki, Gotenba, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/471,483

(22) Filed: Dec. 23, 1999

(30) Foreign Application Priority Data

Jan. 14, 1999 (JP) .......................................... 11-008431

(51) Int. Cl.⁷ .............................. G05B 1/00; G05B 7/00; G05B 11/00; B01J 8/00
(52) U.S. Cl. ...................... 422/108; 422/105; 422/107; 422/188; 422/189; 422/194; 48/61; 48/76
(58) Field of Search .................... 422/105, 107, 422/108, 110, 112, 116, 188, 189, 194; 73/199; 429/19, 17, 13; 48/61, 76

(56) References Cited

U.S. PATENT DOCUMENTS

| | | | |
|---|---|---|---|
| 3,919,114 A | * 11/1975 | Reynolds | 252/373 |
| 3,976,507 A | * 8/1976 | Bloomfield | 429/17 |
| 4,238,468 A | * 12/1980 | Bonacci et al. | 423/359 |
| 4,863,707 A | * 9/1989 | McShea, III et al. | 423/359 |
| 5,173,513 A | * 12/1992 | Pinto | 518/704 |
| 5,271,916 A | * 12/1993 | Vanderborgh et al. | 423/246 |
| 5,316,747 A | * 5/1994 | Pow et al. | 423/247 |
| 5,637,415 A | * 6/1997 | Meltser et al. | 429/17 |
| 6,001,499 A | * 12/1999 | Grot et al. | 429/22 |
| 6,132,689 A | * 10/2000 | Skala et al. | 422/193 |
| 6,238,640 B1 | * 5/2001 | Eguchi et al. | 423/437.2 |

FOREIGN PATENT DOCUMENTS

| | | |
|---|---|---|
| JP | A-5-147903 | 6/1993 |
| JP | A-6-24702 | 2/1994 |

* cited by examiner

*Primary Examiner*—Jerry D. Johnson
*Assistant Examiner*—Alexa A. Doroshenk
(74) *Attorney, Agent, or Firm*—Oliff & Berridge, PLC

(57) ABSTRACT

A shift reaction section 32 is designed to have a maximum capacity of about 40% of the maximum capacity of reforming section 30. When hydrogen-rich gas is supplied to the shift reaction section 32 in excess of its maximum capacity, a blower 46 supplies air to the hydrogen-rich gas in an amount corresponding to the supply of hydrogen-rich gas, and oxidation reaction of carbon monoxide is performed in addition to the shift reaction. By controlling the amount of air supplied, the carbon monoxide concentration at the exit of the shift reaction section 32 is maintained at a concentration less than a predetermined value. As a result, a fuel reformer 20 can be made compact, and at the same time, the energy required to increase the temperature at the time of start up can be reduced.

10 Claims, 4 Drawing Sheets

FUEL REFORMER AND FUEL REFORMING METHOD

BACKGROUND OF THE INVENTION

1. Field of the Invention

The invention generally relates to a fuel and fuel reforming method, and in particular, to a fuel reformer for reforming hydrocarbon fuel to hydrogen-rich fuel and a fuel reforming method for reforming hydrocarbon fuel to hydrogen-rich fuel.

2. Description of the Prior Art

Conventionally, a type of reformer has been proposed which has a reforming section and a shift reaction section (for example, Japanese Patent Laid-Open Publication No. Hei 6-24702). In the reforming section, methanol is reformed to hydrogen-rich gas by reacting at a temperature between 300 and 400° C., and in the shift reaction section, carbon monoxide in the hydrogen-rich gas, reformed at the reforming section, is reacted at a temperature between 200 and 300° C. to increase the percentage of hydrogen present in the hydrogen-rich gas. When methanol is reformed to hydrogen-rich gas by the following equations 1 and 2, the reaction represented by equation 1 is an endothermic reaction and the reaction rate is fast, but the reaction represented by equation 2 is an exothermic reaction and the reaction rate is slow. Because of this, the shift reaction represented by equation 2 cannot sufficiently be performed by the reforming section alone, and therefore the reformer has two reaction layers with different temperatures.

$$CH_3OH \rightarrow CO + 2H_2 \quad \text{(Equation 1)}$$

$$CO + H_2O \rightarrow CO_2 + H_2 \quad \text{(Equation 2)}$$

However, in these conventional reformers, the shift reaction section is required to have a maximum capacity corresponding to the maximum capacity of the reforming section in order to sufficiently perform the shift reaction represented by equation 2, causing the size of the reformer to be large. This increase in size of the reformer causes problems in which a large quantity of energy and a long period of time are required to sufficiently increase the temperature of the shift reaction section at the time of start-up. In addition, the increase in size of the reformer causes another problem that the efficiency is reduced when the reformer is operating in a region much less than the maximum capacity.

SUMMARY OF THE INVENTION

The reformer and reforming method according to the present invention are directed to solving the problems caused by the increase in size of the reformer, and to providing a compact and efficient fuel reformer and a fuel reforming method for providing such a compact and efficient fuel reformer.

The fuel reformer according to the present invention implements the following in order to solve at least some of the objectives described above.

The fuel reformer of the present invention is a fuel reformer for reforming hydrocarbon fuels to hydrogen-rich fuel, comprising a reforming section for reforming the hydrocarbon fuel to hydrogen-rich gas, a shift reaction section, having a maximum capacity in a predetermined ratio to the maximum capacity of the reforming section, for reacting a portion of carbon monoxide present in the hydrogen-rich gas with water and shifting the carbon monoxide to hydrogen and carbon dioxide, an oxidation gas supplier for supplying an oxidation gas containing oxygen to the shift reaction section, and control means which determines excess, with respect to the maximum capacity of the shift reaction section, of the hydrogen-rich gas supplied from the reforming section to the shift reaction section and when the excess is determined, the control means controls the oxidation gas supplier to supply the oxidation gas to the shift reaction section using the oxidation gas supplier.

With the reformer according to the present invention, when the supplied amount of hydrogen-rich gas from the reforming section does not exceed the maximum capacity of the shift reaction section, the percentage of hydrogen present in the hydrogen-rich gas is increased using the shift reaction represented by equation 2 at the shift reaction section, but when the supplied amount of the hydrogen-rich gas to the shift reaction section exceeds the maximum capacity of the shift reaction section, the percentage of the carbon monoxide present in the hydrogen-rich gas is reduced by oxidizing a portion of the carbon monoxide present in the hydrogen-rich gas using the oxygen present in the supplied oxidation gas. Here, predetermined ratio is determined by operative characteristics of the devices (for example, fuel cell and hydrogen engine) which receive the hydrogen-rich gas supply from these fuel reformers. For example, this value can be the average value when the device receiving the hydrogen-rich gas supply is operated, or a value little higher or lower than the average value, a central value at the operating condition, or a value little higher or lower than the central value, or a value derived from overall efficiency of the device.

With the reformer according to the present invention, by setting the maximum capacity of the shift reaction section in a predetermined ratio to the maximum capacity of the reforming section, the shift reaction section can be made compact. As a result, the energy required to increase the temperature of the shift reaction section at start-up can be reduced and at the same time the required period of time can be shortened. Moreover, because the shift reaction section is compact, the reduction in efficiency when operating the fuel reformer at a region much smaller than the maximum capacity of the reforming section can be prevented, thereby improving the overall efficiency of the reformer.

In the fuel reformer according to the present invention, the control means can also control the oxidation gas supplier to set the molar ratio of the carbon monoxide present in the hydrogen-rich gas supplied to the shift reaction section to the oxygen present in the oxidation gas supplied to the shift reaction section to a predetermined molar ratio. In this manner, the amount of oxidation reaction with respect to the shift reaction can be restricted. In the fuel reformer according to this aspect, the molar ratio can be set to a molar ratio of more than 0.05 or more than 0.2. This molar ratio can be determined based on the carbon monoxide concentration permitted by the device which receives the hydrogen-rich fuel from the fuel reformer.

Moreover, the fuel reformer according to the present invention further comprises a gas flow amount detecting means for detecting flow amount of the hydrogen-rich gas supplied to the shift reaction section wherein the control means can decide the excess based on whether or not the flow amount of the hydrogen-rich gas detected by the gas flow amount detecting means exceeds the maximum capacity of the shift reaction section. In this manner, the oxidation gas supplied to the shift reaction section can be controlled based on the flow amount of hydrogen-rich gas supplied to the shift reaction section. In the fuel reformer according to this aspect, the gas flow amount detecting means can detect the flow amount of the hydrogen-rich gas supplied to the shift reaction section based on the supplied amount of the hydrocarbon fuel to the reforming section. In this manner, it can be determined if the flow amount of the hydrogen-rich gas exceeds the maximum capacity of the shift reaction section from the amount of the hydrocarbon fuel supplied to the reforming section, and the oxidation gas supplied to the shift reaction section can be controlled based on the supplied amount of the hydrocarbon fuel.

Alternatively, the fuel reformer according to the present invention further comprises a carbon monoxide concentration sensor for detecting ct, the carbon monoxide concentration, in the hydrogen-rich gas after the reaction at the shift reaction section, wherein the control means determines whether the hydrogen-rich gas supplied to the shift reaction section exceeds the maximum capacity of the shift reaction section based on the carbon monoxide concentration detected by the carbon monoxide concentration sensor. In this manner, the carbon monoxide concentration in the hydrogen-rich gas after the reaction at the shift reaction section can be controlled with high precision. In this aspect of the fuel reformer, the control means can control the oxidation gas supplier to make the carbon monoxide concentration detected by the carbon monoxide concentration sensor less than a predetermined value. In this manner, the carbon monoxide concentration in the hydrogen-rich gas after the reaction at the shift reaction section can be reduced to a value less than a predetermined concentration.

Furthermore, in the fuel reformer of the present invention, if the capacity of the shift reaction section is represented in terms of the volume of the catalyst holding member holding the catalyst necessary for the shift reaction, the predetermined ratio can be a volume less than 50%. In this manner, the shift reaction section can be made small, about half size.

In the fuel reformer of the present invention, the catalyst for shift reaction at the shift reaction section can be copper-zinc catalyst.

The fuel reforming method according to the present invention is a fuel reforming method for reforming hydrocarbon fuel to hydrogen-rich fuel, comprising the steps of (a) reforming the hydrocarbon fuel to hydrogen-rich gas, (b) reacting a portion of carbon monoxide present in the reformed hydrogen-rich gas with water to shift to hydrogen and carbon dioxide, and (c) mixing oxidation gas containing oxygen with the hydrogen-rich gas and supplying the mixture to the reaction layer when supplied amount of hydrogen-rich gas reformed on the step (a) exceeds the capacity of the reaction layer used for step (b).

In this fuel reforming method according to the present invention, when supplied amount of the hydrogen-rich gas does not exceed the capacity of the reaction layer used for step (b), percentage of hydrogen present in the hydrogen-rich gas is increased by the shift reaction represented by equation 2 in step (b), and when supplied amount of the hydrogen-rich gas exceeds the capacity of the reaction layer used for step (b), oxidation gas is mixed with the hydrogen-rich gas, oxidizing a portion of carbon monoxide present in the hydrogen-rich gas, thereby reducing the percentage of carbon monoxide present in the hydrogen-rich gas. As a result, the reaction layer used for step (b) can be made compact, and the required energy and time to increase the temperature of the reaction layer used for step (b) can be reduced. Furthermore, because the reaction layer used for step (b) is compact, the reduction in the efficiency which occurs when fuel is reformed in a region much lower than the maximum capacity of the reaction layer used for step (a) can be prevented, and the overall efficiency of the reformer can be improved.

In the fuel reforming method according to the present invention, step (c) further comprises the steps of (C1) detecting flow amount of hydrogen-rich gas supplied to the reaction layer, (c2) determining whether or not the supplied amount of the hydrogen-rich gas exceeds the capacity of the reaction layer based on the detected flow amount of hydrogen-rich gas, and (c3) mixing the oxidation gas based on the flow amount of hydrogen-rich gas. Also, step (c) of the fuel reforming method according to the present invention further comprises the steps of (c1) detecting carbon monoxide concentration in the hydrogen-rich gas after the step (b), (c2) determining whether or not the supplied amount of the hydrogen-rich gas exceeds the capacity of the reaction layer based on the detected carbon monoxide concentration, and (c3) mixing the oxidation gas based on the carbon monoxide concentration.

In the fuel reforming method according to the present invention, the capacity of the reaction layer used for the step (b) can be made to be less than 50% of the maximum amount of the hydrogen-rich gas supplied from the step (a). Furthermore, in fuel reforming method according to the present invention, the shift reaction of step (b) can be performed using copper-zinc catalyst.

BRIEF DESCRIPTION OF THE DRAWING(s)

DESCRIPTION OF PREFERRED EMBODIMENT(s)

Figure 1:
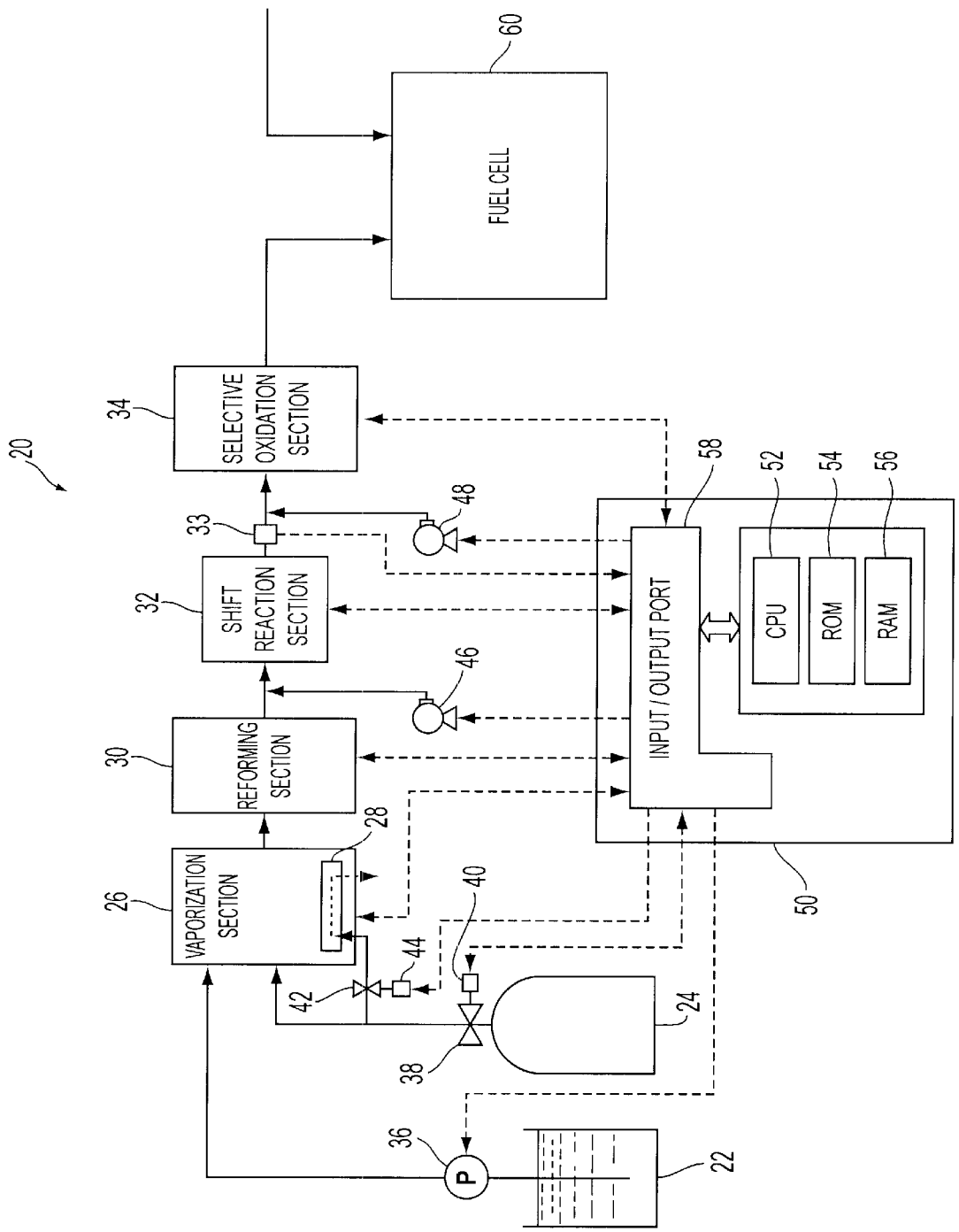
FIG. 1 is a structural figure schematically showing the structure of a fuel reformer 20 according to one embodiment of the present invention.

The preferred embodiment of the present invention is described hereinafter. FIG. 1 schematically shows a fuel reformer 20 according to one embodiment of the present invention. As shown, the fuel reformer 20 is connected to a fuel cell 60, and the fuel cell 60 generates electric power by receiving supply of reformed fuel gas from the fuel reformer 20.

The fuel reformer 20 has a vaporization section 26 for vaporizing water supplied from a water tank 22 and mixing vaporized water and natural gas having methane as its primary constituent, supplied from a natural gas tank 24, a reforming section 30 for reforming the natural gas mixed with the water vapor to hydrogen-rich gas containing hydrogen, a shift reaction section 32 for reforming the shift reaction represented by equation 2 on the carbon monoxide present in the hydrogen-rich gas, a selective oxidation section 34 for selectively oxidizing carbon monoxide which were not shifted by the shift reaction section 32, and an electric control unit 50 for controlling overall operation of the fuel reformer 20.

The water tank 22 is equipped with a pump 36 for supplying water to the vaporization section 26. This pump 36 is connected to the electric control unit 50 via a signal line, and receives drive control through the electric control unit 50. The natural gas tank 24 is a high pressure tank, and at its exit, an electromagnetic valve 38 with flow amount gauge is provided which can adjust the amount of natural gas flow. The actuator 40 of this electromagnetic valve 38 with flow amount gauge is connected to the electric control unit 50 via a signal line, and receives drive control through the electric control unit 50.

A combustion section 28 is provided inside the vaporization section 26 for increasing the internal temperature of vaporization section 26. A portion of the natural gas supplied from the natural gas tank 24 is introduced to the combustion section 28, and the combustion section 28 utilizes this as the heat source. For this purpose, a bypass pipe is provided on the supply pipe of the natural gas to the vaporization section 26, to supply the natural gas to the combustion section 28. An electromagnetic valve 42 is provided on this bypass pipe for controlling the supply amount of the natural gas to the combustion section 28. The actuator 44 of this electromagnetic valve 42 is also connected to the electric control unit 50 via a signal line and receives drive control from the electric control unit 50.

The vaporization section 26 is connected to the electric control unit 50 via a signal line. The inside temperature of the vaporization section 26, detected by a not shown thermometer provided in the vaporization section 26, is controlled by the electric control unit 50 to be at a set temperature (for example, 650° C.) in a range between 600 and 800° C. The actual temperature control is performed by on-off control of the combustion section 28 and open-close control of the electromagnetic valve 42 provided in the bypass pipe.

The reforming section 30 is filled with a pellet holding nickel catalyst. The reforming section 30 is also connected to the electric control unit 50 via a signal line, and is controlled by the electric control unit 50 to have its inner temperature at a set temperature in a region between 600 and 800° C. (for example, 800° C.). The actual control can be performed by controlling flow of the medium of the heat exchanger (not shown) provided on the reforming section 30 to control the temperature of the reforming section 30 detected by a not shown thermometer provided inside the reforming section 30 to be the temperature, but in this embodiment, the temperature control of the reforming section 30 is performed by the temperature control of the vaporization section 26. The natural gas is reformed on the catalyst filling the reforming section 30 to hydrogen-rich gas according to the reactions represented by following equations 3 and 4. Equation 4 is identical to equation 2, and because this reaction is an exothermic reaction, the reaction rate at the temperature of the reforming section 30 (800° C.) will be around 50%, taking thermal equilibrium into account. As a result, the hydrogen-rich gas reformed by the reforming section 30 contains about 10% carbon monoxide.

$$CH_4 + H_2O \rightarrow 3H_2 + CO \qquad \text{(Equation 3)}$$

$$CO + H_2O \rightarrow H_2 + CO_2 \qquad \text{(Equation 4)}$$

Figure 2:
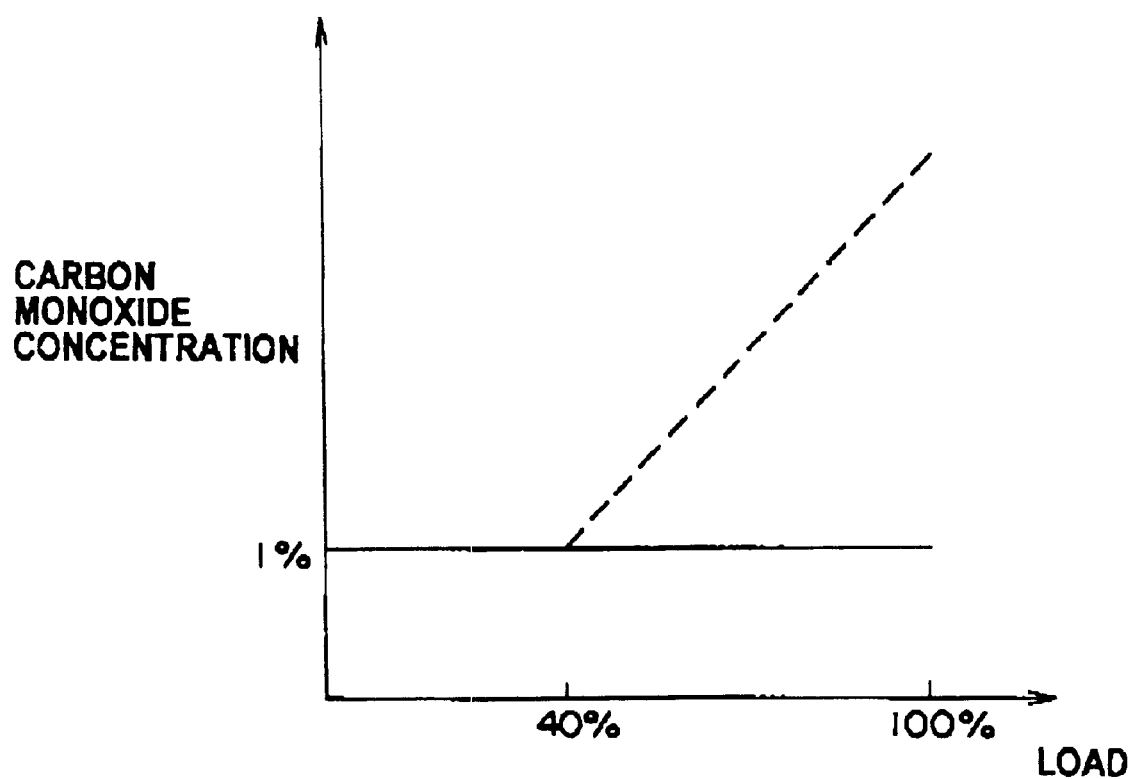
FIG. 2 is a graph showing one example of relationship between supplied amount of hydrogen-rich gas and carbon monoxide concentration in the hydrogen-rich gas at the exit of the shift reaction section 32.

The shift reaction section 32 is filled with pellets holding copper-zinc catalyst for performing the shift reaction represented by equation 4, and its volume is designed to have a maximum capacity when the reforming section 30 operates at 40% of its maximum capacity. That is, the catalyst volume is designed so that when the reforming section 30 is operating at 40% of its maximum capacity or less, the shift reaction section 32 can shift carbon monoxide present in the hydrogen-rich gas supplied from the reforming section 30 by the shift reaction represented by equation 4 to control the concentration of the carbon monoxide in the hydrogen-rich gas to be less than a predetermined concentration (for example, 1%), but when the reforming section 30 is operating in excess of 40% of its maximum capacity, carbon monoxide concentration in the hydrogen-rich gas supplied from the reforming section 30 cannot be controlled to be under the predetermined concentration. One example of the relationship between the supply of hydrogen-rich gas to the shift reaction section 32 and the carbon monoxide concentration present in the hydrogen-rich gas at the exit of the shift reaction section. 32 is shown in FIG. 2. In the figure, load represents amount of hydrogen-rich gas supplied to the shift reaction section 32 with the maximum capacity of the reforming section 30 being taken as 100%. Thus, when the load is 40%, the shift reaction section 32 reaches its maximum capacity and when the load exceeds this value, the carbon monoxide concentration in the hydrogen-rich gas starts to increase.

When air is introduced to the hydrogen-rich gas and the mixture is supplied to the shift reaction section 32, an oxidation reaction represented by equation 5 occurs in the shift reaction section 32 by the oxygen contained in the air, in addition to the shift reaction represented by equation 4. Therefore, when the reforming section 30 operates in excess of 40% of its maximum capacity, the carbon monoxide concentration in the hydrogen-rich gas can be reduced by driving the blower 46 and introducing air to the hydrogen-rich gas, to a concentration less than a predetermined concentration.

$$CO + \tfrac{1}{2}O_2 \rightarrow CO_2 \qquad \text{(Equation 5)}$$

It has been determined from experiments that it is preferable to have the amount of mixture of air to the hydrogen-rich gas, in terms of molar ratio of [O]/[CO], be greater than or equal to 0.05, and more preferably, greater than or equal to 0.2. As an experiment, a cylindrical pellet having a diameter of 3 mm and height of 3 mm holding Cu/ZnO as a catalyst was filled in 10 cm$^3$ of the reaction layer, and the catalyst temperature was increased to 200° C. To this, a model gas/water vapor mixture was supplied at a supply rate of 833 cm$^3$/min., where the model gas was comprised of 80% hydrogen, 9.78% carbon dioxide, and 10.09% carbon monoxide, and the ratio of model gas to the water vapor was 70:30. Air was mixed with the model gas in molar ratios of [O]/[CO]=0, 0.125, and 0.25. The result shows that for molar ratios [O]/[CO] of 0, 0.125, and 0.25 of the mixture of model gas and air, the carbon monoxide concentration of carbon monoxide in the model gas at the exit of the reaction layer were respectively 3.1%, 1.47%, and 1.05%. From this experiment, it can be seen that the carbon monoxide concentration can be reduced with molar ratio [O]/[CO] of greater than or equal to 0.05, and if the molar ratio was 0.2 or greater, the carbon monoxide concentration can be reduced to about 1%.

The shift reaction section 32 is also connected to the electric control unit 50 via a signal line, and its temperature is controlled, by the electric control unit 50, to be within a range between 200 and 400° C., so that the shift reaction represented by equation 4 is shifted to the right side of the equation by thermal equilibrium.

Selective oxidation section 34 is filled with pellets holding platinum-ruthenium catalyst for performing the oxidation reaction represented by equation 5 with higher priority than the oxidation reaction of hydrogen. Like the reforming section 30 and the shift reaction section 32, the selective oxidation section 34 is connected to the electric control unit 50 via a signal line, and its temperature is controlled, by the electric control unit 50, to be within a range between 100 and 200° C. In this embodiment, a carbon monoxide concentration gauge 33 for detecting the carbon monoxide concentration in the hydrogen-rich gas and a blower 48 for mixing air with the hydrogen-rich gas are provided between the shift reaction section 32 and the selective oxidation section 34. Air can be mixed with the hydrogen-rich gas by the blower 48 based on the carbon monoxide concentration detected by the carbon monoxide concentration gauge 33. Both the carbon monoxide concentration gauge 33 and the blower 48 are also connected to the electric control unit 50 via signal lines.

The electric control unit 50 is a microcomputer with a CPU as its main component, and comprises a ROM 54 for storing the process programs executed by the CPU 52 and various data, a RAM 56 for temporarily storing data, and an input/output port 58 for inputting various data and outputting control signals. The input/output port 58 takes various data as an input such as the weight flow amount of natural gas from the electromagnetic valve 38 with a flow amount gauge, the temperature from various not shown thermometers provided at the vaporization section 26, reforming section 30, shift reaction section 32, and selective oxidation section 34, and carbon monoxide concentration in the hydrogen-rich gas from the carbon monoxide concentration gauge 33. As output, the input/output port 58 outputs drive signals to the pump 36, to the actuator 40 of the electromagnetic valve 38 with flow amount gauge, to the actuator 44 of the electromagnetic valve 42, an on-off signal to the combustion section 28 of the vaporization section 26, and drive signals to the blowers 46 and 48.

Figure 3:
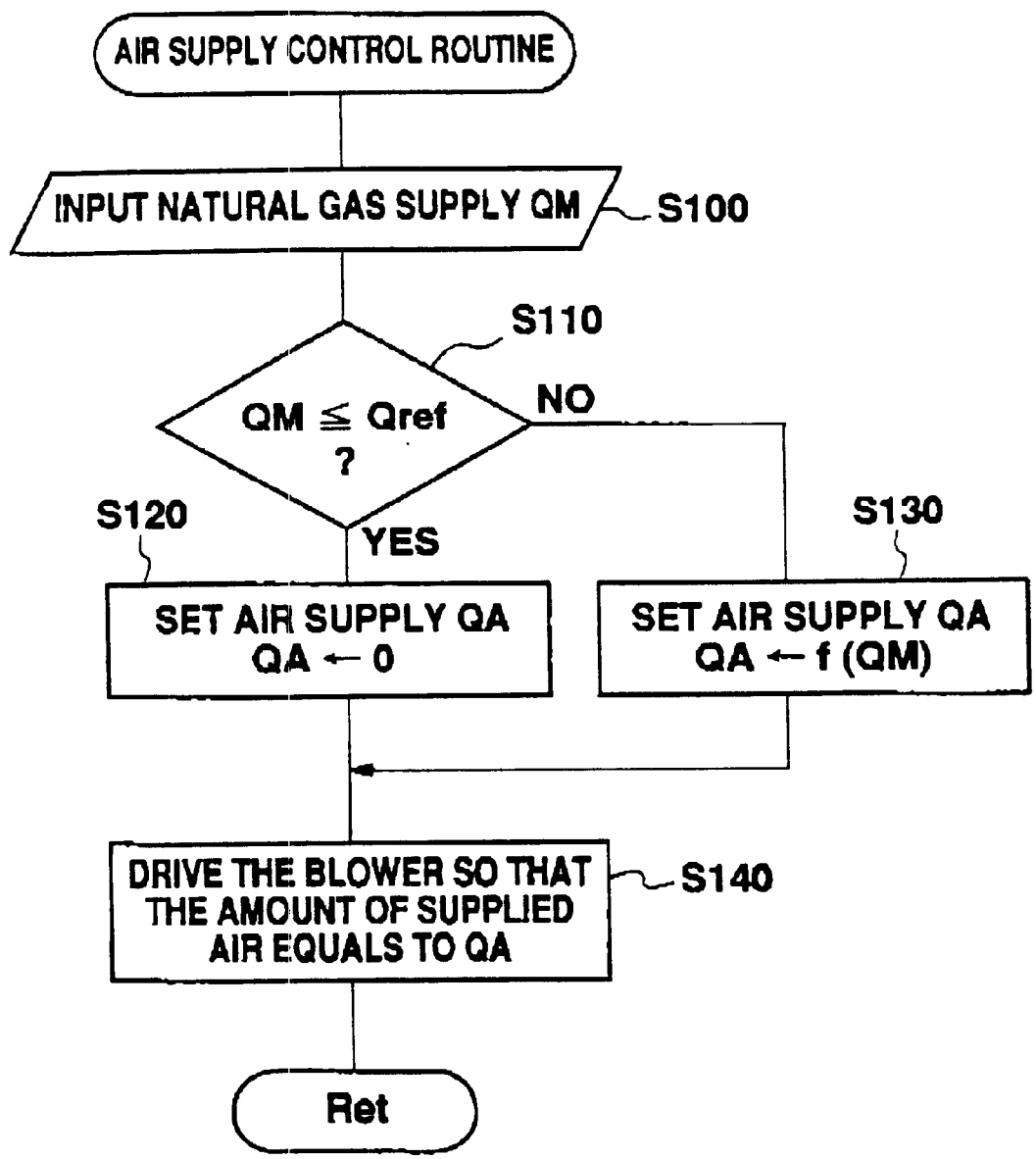
FIG. 3 is a flowchart showing one example of air supply control routine executed by a CPU 52 of a fuel reformer 20 according to one embodiment.

The fuel reformer 20 of the embodiment thus constructed executes an air supply control routine exemplified on FIG. 3 to control the amount of air mixed with the hydrogen-rich gas supplied to the shift reaction section 32. This air supply control routine is repeated in a predetermined cycle (for example, once every 10 ms).

When this air supply control routine is executed, the CPU 52 first executes the reading process of flow of natural gas, detected by the electromagnetic valve 38 with flow gauge, as a natural gas supply QM (step S1OO). The read natural gas supply QM is then compared with a threshold value Qref (step S110). The threshold Qref is set at a value corresponding to the maximum capacity of the shift reaction section 32. When the natural gas supply QM is less than or equal to the threshold value Qref, it is decided that the supply does not exceed the maximum capacity of the shift reaction section 32, and the air supply QA to the hydrogen-rich gas supplied by blower 46 is set at a value of 0 (step S120). When the natural gas supply QM exceeds the threshold Qref, it is decided that the supply exceeds the maximum capacity of the shift reaction section 32, and the air supply QA to the hydrogen-rich gas supplied by the blower 46 is set at a value based on the natural gas supply QM (for example, amount of air which will make aforementioned molar ratio of [O]/[CO] equal to 0.2) (step S130). Then the blower 46 is driven so that the amount of air mixed with the hydrogen-rich gas supplied to the shift reaction section 32 is equal to QA (step 140), and the routine is completed.

As mentioned above, when the natural gas supply QM is less than or equal to a value corresponding to the maximum capacity of the shift reaction section 32, the air supply QA by the blower 46 is set at a value of 0, and the carbon monoxide is shifted to hydrogen and carbon dioxide by the normal shift reaction at the shift reaction section 32. When the natural gas supply QM exceeds the value corresponding to the maximum capacity of the shift reaction section 32, blower 46 supplies air to the hydrogen-rich gas supplied to the shift reaction section 32, the amount of air supply QA being dependent on the natural gas supply QM, and oxidation reaction of the carbon monoxide occurs in the shift reaction section 32 in addition to the normal shift reaction, to reduce the carbon monoxide concentration in the hydrogen-rich gas.

According to the fuel reformer 20 of the embodiment, when hydrogen-rich gas is supplied to the shift reaction section 32 in a range which does not exceed the maximum capacity of the shift reaction section 32, the percentage of hydrogen present in the hydrogen-rich gas is increased by the normal shift reaction, and at the same time the carbon monoxide concentration in the hydrogen-rich gas is reduced to less than a predetermined concentration. When the supply exceeds the maximum capacity of the shift reaction section 32, air is mixed to induce oxidation reaction in addition to the shift reaction, to increase the percentage of hydrogen present in the hydrogen-rich gas and reduce the carbon monoxide concentration to less than a predetermined concentration. As a result, a decrease in the size of the shift reaction section 32 is possible, enabling reduction in both energy and time required to increase the temperature of the shift reaction section 32 at the start-up of the fuel reformer 20. Also, because the shift reaction section 32 is small, even when the reforming section 30 is operating at a region much less than its maximum capacity, the efficiency of the fuel reformer 20 is not reduced, and the overall efficiency of the fuel reformer 20 can be improved. When this fuel reformer 20 and fuel cell 60 are loaded on a vehicle, above mentioned effect is emphasized. In this case, depending on the drive characteristic of the vehicle, the average energy for driving can be assumed to be 40% to 50% of the maximum required energy for the vehicle so that the shift reaction section 32 can be designed to have its maximum capacity around 40% to 50% of the maximum capacity of the reforming section 30.

In the fuel reformer 20 of this embodiment, by detecting the flow of natural gas flowing out of the natural gas tank 24 as the supply amount of natural gas, the excess of the supplied amount of the hydrogen-rich gas supplied to the shift reaction section 32 with respect to the maximum capacity of the shift reaction section 32 is determined, and air is then mixed with the hydrogen-rich gas supplied to the shift reaction section 32, with an amount dependent on the supplied amount of natural gas. It is also possible to provide a flow gauge between the reforming section 30 and the shift reaction section 32 for detecting flow amount of hydrogen-rich gas, determine the excess of the supply of the hydrogen-rich gas to the shift reaction section 32 with respect to the maximum capacity of the shift reaction section 32 based on the amount of hydrogen-rich gas detected at the flow gauge, and then set the amount of air to be mixed with the hydrogen-rich gas.

Figure 4:
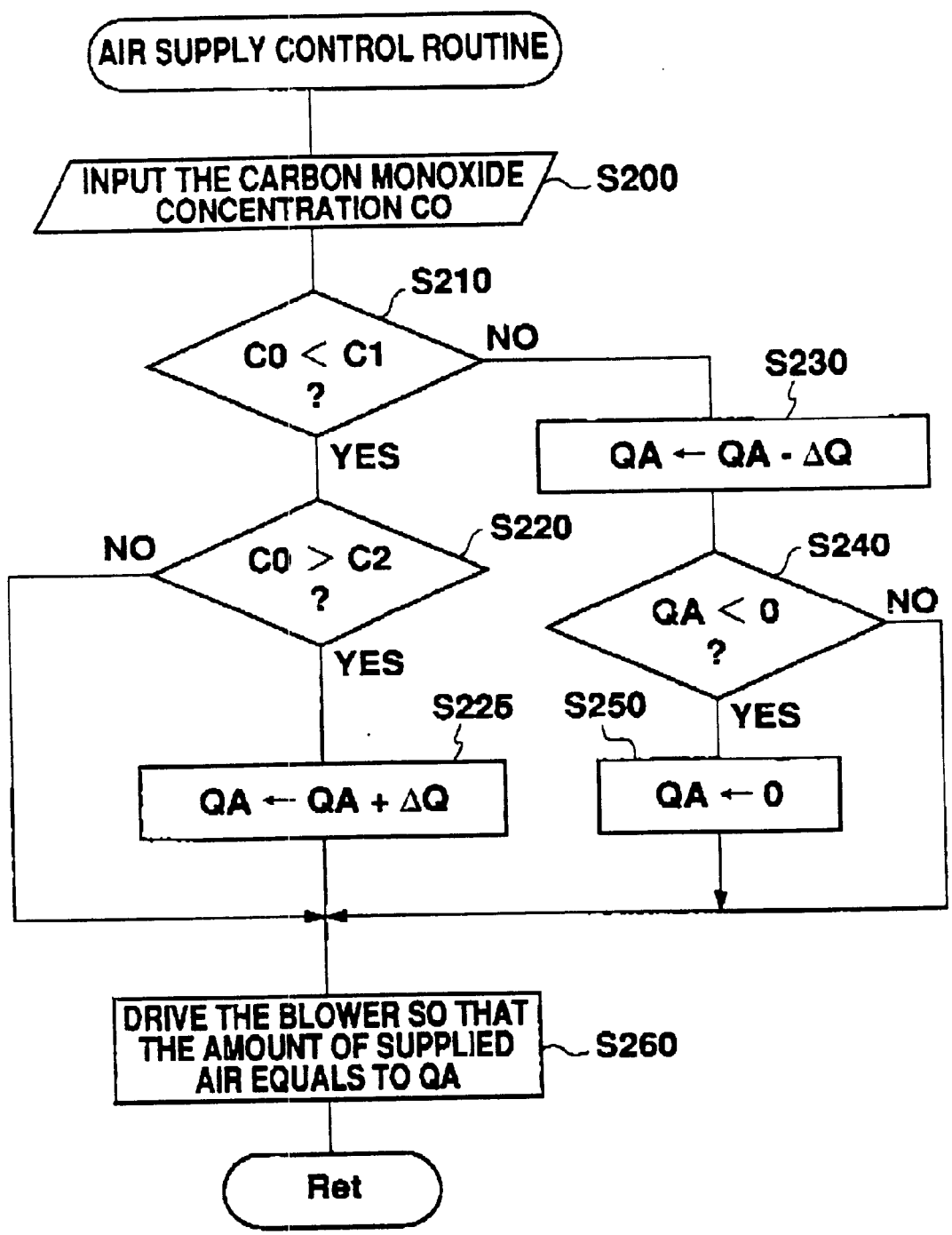
FIG. 4 is a flowchart showing another example of an air supply control routine according to a modified reformer.

Moreover, it is possible to provide a carbon monoxide concentration gauge 33 between the shift reaction section 32 and the selective oxidation section 34, detect the carbon monoxide concentration CO at the exit of the shift reaction section 32 by the carbon monoxide concentration gauge 33, and set the amount of air mixed to the hydrogen-rich gas supplied to the shift reaction section 32 based on the carbon monoxide concentration CO. In this case, an air supply control routine exemplified on FIG. 4 is executed in place of the air supply control routine shown on FIG. 3. The routine shown on FIG. 4 is described hereinafter.

When the air supply control routine shown on FIG. 4 is executed, the CPU 52 first reads the carbon monoxide concentration CO in the hydrogen-rich gas at the exit of the shift reaction section 32 detected by the carbon monoxide concentration gauge 33 (step S200) and compares the read carbon monoxide concentration CO with a threshold value C1 and another threshold value C2 (step S210, S220). The threshold value C2 is set as the permitted carbon monoxide concentration in the hydrogen-rich gas at the exit of the shift reaction section 32, and the threshold value C1 is set at a value slightly less than the threshold value C2 in order to introduce a hysteresis so that increase/decrease of the amount of air supply QA to the hydrogen-rich gas does not occur too often. The amount of air supply QA is not changed when the carbon monoxide concentration CO is equal to a value between the threshold values C1 and C2. When the carbon monoxide concentration CO exceeds the threshold value C2, the amount of air supplied QA is increased by ΔQ (step S225) and when the carbon monoxide concentration CO is less than the threshold value C1, the amount of air supplied is reduced by ΔQ (step S230). Here the amount of change (increase or decrease) ΔQ is determined by the dimensions of the fuel reformer 20 and the repeat frequency of execution of the routine shown in FIG. 4, etc. If the amount of air QA becomes a negative value as a result of the reduction at step S230 by ΔQ, the amount of air supplied QA is set at a value of 0 (step S240, S250). Then the blower 46 is driven so that the amount of air, supplied by the blower 46, to be mixed with the hydrogen-rich gas supplied to the shift reaction section 32 equals QA (step S260).

In the modified example of the fuel reformer 20 for executing the air supply control routine shown on FIG. 4, the excess of hydrogen-rich gas with respect to the maximum capacity of the shift reaction section 32 is determined only after the fuel reformer 20 is started up and when the carbon monoxide concentration CO detected by the carbon monoxide concentration gauge 33 exceeds the threshold C2. Moreover, because the carbon monoxide concentration CO detected by the carbon monoxide concentration gauge 33 is used for the feedback control, the carbon monoxide concentration CO in the hydrogen-rich gas at the exit of the shift reaction section 32 can be reliably reduced to less than a desired concentration.

In the fuel reformer 20 of the embodiment, natural gas with methane as its primary constituent is used. However, saturated hydrocarbons such as ethane, unsaturated hydrocarbons such as ethylene, and alcohols of hydrocarbon such as methanol can also be used as the fuel to be reformed. In this case, a gauge for measuring respective weight flow must be provided in place of the electromagnetic valve 38 with flow gauge, catalyst filling the reforming section 30 must be changed to catalyst corresponding to the fuel to be reformed, and the temperature at the vaporization section 26 and reforming section 30 must be set at a temperature corresponding to the fuel to be reformed.

Furthermore, the blower 46 is used to mix air with the hydrogen-rich gas supplied to the shift reaction section 32 in this embodiment, but any oxidation gas containing oxygen can be used.

In addition, in the fuel reformer 20 of this embodiment, the hydrogen-rich gas is supplied to the fuel cell 60 as a reformed fuel reformed by the fuel reformer 20, but it can also be supplied to hydrogen consumption devices other than a fuel cell 60, such as hydrogen engine which uses hydrogen as its fuel. In this case, the catalyst volume in the shift reaction section 32 can be set depending on the usage characteristics of the hydrogen consumption devices.

The embodiments of the present invention are described using an example. However, it should be understood that this description is not for the purpose of limiting the invention, and that the present invention can be practiced in various forms, without departing from the concept of the present invention.

What is claimed is:

1. A fuel reformer for reforming a hydrocarbon fuel to a hydrogen-rich gas, comprising:

a reforming section for reforming the hydrocarbon fuel to the hydrogen-rich gas, having a first capacity;

a shift reaction section having a second capacity in a ratio to the first capacity, for reacting a portion of carbon monoxide present in the hydrogen-rich gas supplied from the reforming section with water to shift the carbon monoxide to hydrogen and carbon dioxide;

an oxidation gas supplier for supplying an oxidation gas containing oxygen to the shift reaction section; and control means for determining an excess of the hydrogen-rich gas supplied to the shift reaction section from the reforming section with respect to the second capacity and controlling the oxidation gas supplier to supply the oxidation gas to the shift reaction section based on the excess;

wherein in the shift reaction section, carbon monoxide present in the hydrogen-rich gas supplied from the reforming section is reacted with water to shift the carbon monoxide to hydrogen and carbon dioxide, and oxygen supplied by the oxidation gas supplier is reacted with carbon monoxide present in the hydrogen-rich gas to yield carbon dioxide, when the oxygen is supplied to the shift reaction section.

2. The fuel reformer according to claim 1, wherein:

the control means controls the oxidation gas supplier so that a molar ratio of carbon monoxide contained in the hydrogen-rich gas supplied to the shift reaction section to the oxygen contained in the oxidation gas supplied to the shift reaction section is maintained.

3. The fuel reformer according to claim 2, wherein the molar ratio is more than 0.05.

4. The fuel reformer according to claim 2, wherein the molar ratio is more than 0.2.

5. The fuel reformer according to claim 1, further comprising:

gas flow detecting means for detecting a flow amount of the hydrogen-rich gas supplied to the shift reaction section;

wherein, the control means determines the excess based on whether or not the flow amount of the hydrogen-rich gas detected by the gas flow detecting means exceeds the second capacity.

6. The fuel reformer according to claim 5, wherein the gas flow detecting means detects the flow amount of hydrogen-rich gas supplied to the shift reaction section based on an amount of the hydrocarbon fuel supplied to the reforming section.

7. The fuel reformer according to claim 1, further comprising:

a carbon monoxide concentration sensor for detecting a carbon monoxide concentration in the hydrogen-rich gas after a reaction in the shift reaction section;

wherein the control means determines an excess of the hydrogen-rich gas supplied to the shift reaction section with respect to the second capacity based on the carbon monoxide concentration detected by the carbon monoxide concentration sensor.

8. The fuel reformer according to claim 7, wherein the control means controls the oxidation gas supplier so that the carbon monoxide concentration detected by the carbon monoxide concentration sensor is maintained.

9. The fuel reformer according to claim 1, wherein the ratio is less than 50% on a volume basis when the second capacity is a volume of a catalyst holding section that holds catalysts necessary for a shift reaction.

10. The fuel reformer according to claim 1, wherein the shift reaction section comprises a copper-zinc catalyst for a shift reaction.

* * * * *